US010007010B2

(12) United States Patent
Iltis

(10) Patent No.: US 10,007,010 B2
(45) Date of Patent: Jun. 26, 2018

(54) METHOD FOR DETERMINING THE DEPTH OF AN INTERACTION IN A PIXELLATED RADIATION DETECTOR, AND ASSOCIATED DETECTOR AND APPLICATION

(71) Applicant: Alain Iltis, Troyes (FR)

(72) Inventor: Alain Iltis, Troyes (FR)

( * ) Notice: Subject to any disclaimer, the term of this patent is extended or adjusted under 35 U.S.C. 154(b) by 49 days.

(21) Appl. No.: 14/906,859

(22) PCT Filed: Jul. 4, 2014

(86) PCT No.: PCT/FR2014/051739
§ 371 (c)(1),
(2) Date: Jan. 21, 2016

(87) PCT Pub. No.: WO2015/011360
PCT Pub. Date: Jan. 29, 2015

(65) Prior Publication Data
US 2016/0178765 A1 Jun. 23, 2016

(30) Foreign Application Priority Data
Jul. 24, 2013 (FR) ...................................... 13 57315

(51) Int. Cl.
*G01T 1/29* (2006.01)
*G01T 1/20* (2006.01)

(52) U.S. Cl.
CPC .......... *G01T 1/2985* (2013.01); *G01T 1/2002* (2013.01); *G01T 1/2018* (2013.01)

(58) Field of Classification Search
CPC .... G01T 1/2985; G01T 1/2002; G01T 1/2018
(Continued)

(56) References Cited

U.S. PATENT DOCUMENTS

| 6,528,793 | B1* | 3/2003 | Chen | G01T 1/2985 |
| | | | | 250/363.02 |
| 2009/0134334 | A1* | 5/2009 | Nelson | G01T 1/2002 |
| | | | | 250/361 R |

(Continued)

FOREIGN PATENT DOCUMENTS

WO 2013101956 A1 7/2013

OTHER PUBLICATIONS

J.F. Pratte et al: "Design of a Fast-Shaping Amplifier for PET/CT APD Detectors With Depth-of-Interaction", IEEE Transactions on Nuclear Science, IEEE Service Center, New York, NY US, vol. 49, No. 5, Oct. 1, 2002, XP011077838, ISSN: 0018-9499 abstract Section 5 "Results"; figures 5,6.

(Continued)

*Primary Examiner* — David Porta
*Assistant Examiner* — Gisselle Gutierrez
(74) *Attorney, Agent, or Firm* — Amster, Rothstein & Ebenstein LLP

(57) ABSTRACT

The invention concerns a method for determining the depth of an interaction in a pixellated gamma radiation detector characterized in that it comprises the following steps: —detecting first photons on the detector (10); —measuring the arrival time (Tpc) of said first photons on the detector (10) for a central pixel; —measuring the arrival time (Tpa) of the first photons in a pixel adjacent to said central pixel; —comparing the time (Tpa) with the time (Tpc) in order to estimate the depth of interaction (Z) owing to the different light propagation speeds in adjacent pixels; —integrating the radiation emitted over the whole of the emission of a crystal of the detector in order to determine the energy of the interaction; and —recording the integral of the energy emitted by this detection. The invention further concerns a pixellated gamma radiation detector for implementing the (Continued)

above method. The invention further concerns a method of time calibration of pixellated detectors between same and the application of said pixellated detector in PET imaging.

10 Claims, 2 Drawing Sheets

(58) Field of Classification Search
USPC .......................................................... 250/362
See application file for complete search history.

(56) References Cited

U.S. PATENT DOCUMENTS

| 2010/0108896 A1 | 5/2010 | Surti et al. |
| 2013/0020487 A1* | 1/2013 | Siegel .................. G01T 1/2985 250/362 |
| 2013/0050487 A1 | 2/2013 | Omer et al. |
| 2016/0131769 A1* | 5/2016 | Wieczorek ............ G01T 1/2018 250/369 |

OTHER PUBLICATIONS

International Search Report of PCT/FR2014/051739 dated Oct. 29, 2014.
Written Opinion of PCT/FR2014/051739 dated Oct. 29, 2014.

* cited by examiner

METHOD FOR DETERMINING THE DEPTH OF AN INTERACTION IN A PIXELLATED RADIATION DETECTOR, AND ASSOCIATED DETECTOR AND APPLICATION

TECHNICAL FIELD OF THE INVENTION

The invention relates to gamma sources imaging, and the invention more specifically relates to a method for determining the depth of interaction in a pixellated scintillation detector of gamma radiation and the pixellated detector using a time effect for measuring the depth of interaction and application of said detector to PET or TEP imaging (positron-emission tomography).

Positron-emission tomography (TEP or PET) is a nuclear imaging technique that uses radioactive nuclei. Such nuclei disintegrate while emitting a positron which produces two gamma photons emitted at 180° by interacting with neighboring nuclei. A conventional PET scanner consists of detection modules surrounding the patient and radially oriented towards the center of the system.

PRIOR ART

In gamma-ray scintillation detectors in general, knowing the depth of interaction relative to the radiation inlet face in the crystal is preferable. This is particularly true in PET type detectors using time of flight (TOF), where a crystal ring with a large form factor (4*4*30 mm pixels) is positioned around a central source. As a matter of fact, not knowing the place of interaction, at the head or at the foot of the crystal, induces two errors:

A geometric parallax;

Uncertainty as regards the exact time of flight of the photon owing to the light propagation in the crystal at a lower speed than that of light in a vacuum (c/n).

Several approaches have been studied in order to add the radial coordinate to the measurement. Detectors measuring the depth of interaction have been proposed. An alternative consists in using axial geometry: the detection modules are then axially oriented, in parallel with the patient. Such geometry makes it possible to measure the depth of interaction (transverse plane) and the axial position (axial plane) by coupling two photo-detectors at each end.

The article IEEE Trans on NucScience NS-41, pp 14451441 (1994) W. W. Moses et al, discloses a method for determining the depth of interaction in a PET module. The detection module consists of a BGO crystal matrix (3×3×30 mm) which is coupled to a silicon photodiode on one face and, on the opposite face, which is coupled to a photomultiplier tube. The faces are coated with a reflector, so that the amplitude of the signal observed in the photodiode and the photomultiplier tube depends on the depth of interaction of the photon (511 keV) in the scintillator crystal. The ratio of these two signals can then be used to determine the depth of interaction of an event according to each case. The article "High resolution TOF PET with DOI: a proof of principle", Cosentino et al, discloses a method for processing the surfaces of a scintillator comprising suitable photo-detectors, electronics and specific algorithms for analysing raw data, in order to obtain an optimum compromise between the detector, the energy, the time and the resolution of the depth of interaction. Each scintillator will have, at the ends thereof, two SIPMs coupled for collecting scintillation light as much as possible, and thus maximizing the energy resolution. The role of each detector is to detect emitted 511 keV gamma rays, in coincidence with one of the external detectors.

To solve the problem of determining the depth of interaction (DOI), several solutions have been proposed:

Using a stack of crystals of different types (e.g. BGO/GSO), but this solution is very expensive and complex and gives limited accuracy only.

Acting on the reflective power of the pixels along their length by polishing the reflectors. But this solution is difficult to achieve on an industrial scale and the decoding thereof may be ambiguous to a certain extent.

Reading the pixel at both ends, which makes it possible to estimate the position of the interaction thanks to the light intensity ratio. This is the most viable solution. However it has several drawbacks:

It doubles the number of required electronic channels

Measures processing is complex

A layer of detectors is traversed by the radiation, which induces Compton scattering Such dual reading degrades the measuring of the energy of the interaction To solve this problem a new solution is based on the fact that it is now possible to measure the arrival time of the first photons on a suitable detector (i.e. Si-PMT) for each pixel with a great accuracy (<100 ps) and then to record the integral of the energy emitted by this event with a great precision.

Additionally, scintillators of the LSO type are expensive and it would be advantageous to be able to use scintillators of the lanthanum halides type which are cheaper and faster than LSO and the derivatives thereof for PET. However, their spatial resolution is degraded by a large number of events for which Compton scattering occurs and, therefore, the energy of the interaction is deposited onto one or more adjacent pixel(s).

DISCLOSURE OF THE INVENTION

The invention aims at providing a method for determining the depth of interaction in a pixellated gamma radiation detector. The method is characterised in that it comprises the following steps:

detecting the first photons on the detector;

measuring the arrival time ($T_{pc}$) of said first photons on the detector for a central pixel; this time is equal to $Ti+Z/(c/n)$; where Ti is the time of interaction; Z is the depth of the interaction on the detector and c/n corresponds to the speed of propagation of the radiation in said central pixel;

measuring the arrival time ($T_{pa}$) of the first photons in a pixel adjacent to said central pixel; this time is approximately equal to $Ti+Z/(c/2n)$; where Ti is the time of interaction; Z is the depth of the interaction on the detector and c/2n corresponds to the speed of propagation of the radiation in said pixel adjacent to the central pixel;

comparing the time ($T_{pa}$) with the time ($T_{pc}$) in order to estimate the depth of interaction (Z) owing to the different light propagation speeds in a pixel adjacent to the central pixel;

integrating the radiation emitted over the whole of the emission of a detector of the scintillator of the detector in order to determine the energy of the interaction;

recording the integral of the energy emitted by this detection.

The issue is here to measure the arrival time of the first photons on each pixel individually.

Owing to multiple reflections on the surface of a pixel adjacent to the central pixel, the light propagation speed (c/2n) in this adjacent pixel is reduced by a factor of two (the limit for an infinitely long perfect scattering pixel).

A gamma radiation detector for implementing the method according to claim 1 comprising a gamma source γ, a crystal scintillator 10 equipped with at least one photo-detector 11 capable of detecting the light individually emitted on each of the pixels, with said photo-detector being coupled to a microelectronic component of the ASIC type, with the reading of the at least one photo-detector 11 being executed by said microelectronic component, characterised in that the scintillator 10 is pixellated, in that the microelectronic component is adapted to measure the arrival time (Tpc) of the first photons on a first central pixel 12 and the arrival time (Tpa) of the first photons on a first pixel 13 adjacent to said first central pixel, so that a comparison of the time (Tpc) and the time (Tpa) makes it possible to estimate the depth of interaction (Z), and then to integrate the emitted energy.

Advantageously, the detector is adapted to measure a number of photons detected during the light propagation time along the length of each pixel, i.e. during the first two hundred to six hundred picoseconds; with said number of detected photons depending on the solid angle at which the interaction is seen for a given photon energy. This has the advantage of reducing the ambiguity in case of a Compton effect. As a matter of fact, in case of a Compton effect, both photons simultaneously arrive on the adjacent pixels, but the number of photons detected in the adjacent pixel is low.

PET is conventionally used to measure the arrival time of the first photons on a pixel (Trigger). Then knowing the energy of the incident gamma photon is also desired. Therefore the number of photons detected after the first trigger is measured over a long time (several hundreds of ns). Such conventional measures are relevant, however, according to the present invention, another measure relating to the number of photons detected after the trigger for a short time (100 to 600 ps), smaller than 2-3 times the time of transfer of the light in the pixel is added. As a matter of fact, those first detected photons are mainly non scattered photons. In addition, the number of non-scattered photons detected for a given time depends on the depth of interaction and therefore on the angle at which the interaction is seen.

The faces of the pixels composing the scintillator are preferably scattering and the pixels are separated by a semi-transparent scattering medium.

According to the invention, the semi-transparent scattering medium comprises a scattering rough crystal, an optical grease or a white powder filler dispersed in the optical grease such as boron nitride, alumina, barium sulfate.

Said semi-transparent scattering medium is more particularly adapted to ensure a partial transfer of the light from the central pixel to the adjacent pixel and a scattering of the light passing through or reflected by said medium.

Preferably, the scintillator emits most of its light in less than 100 ns and is preferably of the Lanthanum halide, LaBr3 type and/or the derivatives thereof.

The scintillator may also be of the Lutetium silicate, (LSO, LYSO . . . ) type and/or the derivatives thereof.

As a matter of fact, owing to the multiple reflections on the surface of a pixel adjacent to the central pixel, the light propagation speed (c/2n) in the adjacent pixel is reduced by a factor of two by a phenomenon of random propagation (the limit for an infinitely long perfect scattering pixel).

The invention also relates to a method for the time calibration of several gamma radiation detectors defined above. The method is characterised in that it comprises the following steps;

sending a pulse of laser light to simultaneously illuminate said detectors;

measuring the arrival time of photons 1, 2, 3 for all the channels;

calibrating the time response of each detection element.

The invention also relates to the application of the above radiation detector to PET imaging.

The invention also relates to the use of a microelectronic component of the ASIC type in a gamma radiation detector defined above, characterised in that said component is capable of measuring the arrival time of the first photons on a pixel with an accuracy of less than 100 ps, and in that it is further capable of integrating the radiation emitted over the whole scintillator emission in about 500 ns in order to determine the energy of the interaction.

BRIEF DESCRIPTION OF THE FIGURES

Other characteristics, details and advantages of the invention will appear upon reading the following description, with reference to the appended figures.

DETAILED DESCRIPTION

Figure 1:
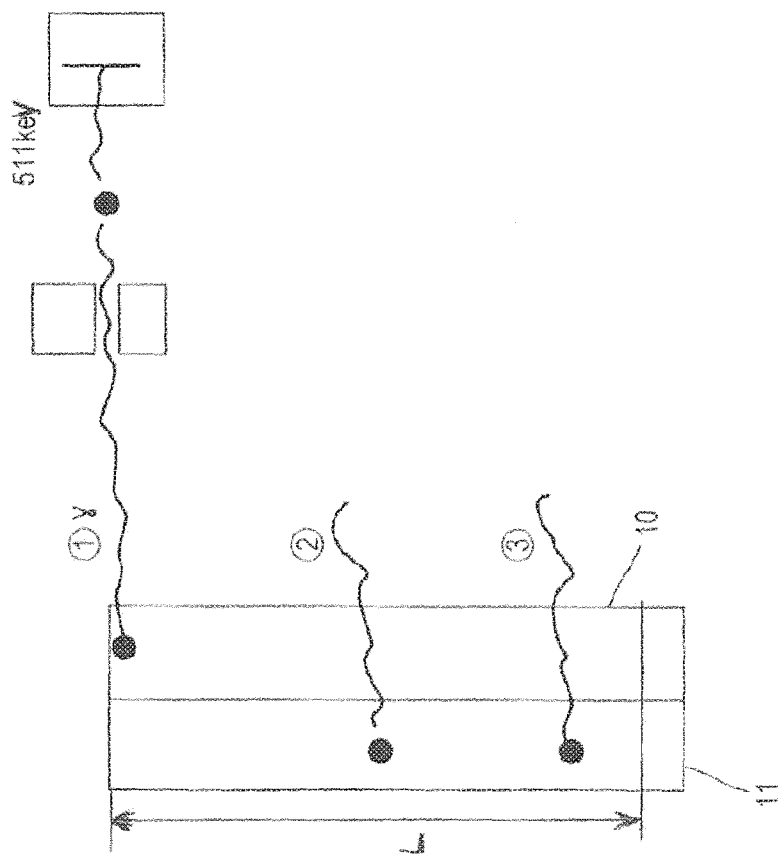
FIG. 1 shows a part of a pixellated detector according to the invention as well as the time mapping of a gamma ray in a central pixel and a pixel adjacent to said central pixel of a segmented scintillator.

In the gamma scintillation detectors in general, knowing the depth of interaction with respect to the radiation inlet face is preferable.

Several solutions have been presented above to solve the problem of determining a depth of interaction. However, the proposed solutions each have drawbacks: —doubling the number of electronic channels required for the processing; —the processing of the measures is complex; —a detector layer is traversed by the radiation, inducing Compton scattering, thus degrading the measurement of the energy of the interaction.

To solve the problem of determining a depth of interaction, the invention provides a new solution based on the fact that it is now possible to measure very accurately, within a time of less than 100 ps, the arrival time of the first photons on a suitable detector, i.e. Si-PMT, for each pixel and then to precisely record the integral of the energy emitted by this event (detection).

For this purpose, the method for determining the depth of interaction in a gamma radiation detector according to the present invention comprises, in a first step, the detection of the first photons on the detector, then the arrival time (Tpc) of said first photons on the detector for a central pixel 12 is measured; such time is equal to Ti+Z/(c/n); where Ti is the time of interaction; Z is the depth of the interaction on the detector and c/2n corresponds to the speed of propagation of the radiation in said central pixel. The third step of the method consists in measuring the arrival time ($T_{pa}$) of the first photons in a pixel adjacent 13 to said central pixel. Such time is approximately equal to Ti+Z/(c/2n); where Ti is the time of interaction; Z is the depth of the interaction on the detector and c/2n corresponds to the speed of propagation of the radiation of said pixel adjacent to the central pixel. When comparing the time (Tpc) and the time ($T_{pa}$), the depth of interaction can be estimated, and, when integrating the radiation emitted over the whole emission of a scintillator 10 of the detector, the energy of the interaction can be determined and the integral of the energy emitted by such detection can be recorded. According to the method of the present invention, the arrival time of the first photons on each pixel can be individually measured.

The invention further comprises a detector for implementing the method above. In the detector, the scintillator is pixellated with a detection element corresponding to each pixel and a difference exists between the pixel where the interaction occurs and the adjacent pixels where light is scattered.

In a conventional PET configuration, sending a maximum of light towards the outlet face of the pixel is desired. This is the reason why the side faces of the scintillators (pixels) are typically scattering and coated with a white reflector, the function of which is to return the light to the central pixel. This reflector layer thus acts as an optical isolator. In other words, there is no coupling medium, so that the step index confines the light within the central pixel. In such configuration types, the interface comprises (scattering) rough crystal, air or scattered reflector, typically Teflon.

The configuration according to the invention has different aims. The function of the optical interface according to the present invention is specifically to secure:

a partial transfer of the light from the central pixel to the adjacent pixel.

a scattering of the light passing through or reflected by this interface.

The light must not be lost, however, and this is the reason why the design of this interface is different. In other words, said interface may include: a scattering rough crystal, an optical grease so as to avoid a step index, or a white powder filler dispersed in the optical grease such as: boron nitride, alumina, barium sulfate, BaSO4.

The present invention mainly aims at the whole radiation reaching this face of the scintillator being scattered, mainly in the central pixel, but also partly in the first adjacent pixel.

In the detector according to the invention, the faces of the pixels are assumed to be scraped or scattering, and the pixels are assumed to be separated by a semi-transparent scattering medium, comprising a streaming medium of the step index type and of a scattering filler such as Teflon or a white powder such as alumina or barium carbonate. In FIG. 1, reference 14 corresponds to said step index. Such step index is placed at the boundary between two pixels and consists of (scattering) rough crystal optical grease in order to avoid a step index a white powder filler dispersed in the optical grease (boron nitride, alumina, barium sulfate, BaSO4, . . . )

In the pixel where the initial, whether primary or of the Compton type, interaction takes place, the radiation is emitted isotropically. FIG. 1 shows a part of a pixellated detector according to the invention, wherein the method is implemented. In this detector, a part of the first photons emitted to the scintillator 10 is propagated in a straight line toward a photo-detector 11. The photo-detector 11 is adapted to detect the light emitted on all the pixels and is coupled to a microelectronic component of the ASIC type (not shown). This component is able to individually measure, with an accuracy of less than 100 ps, the arrival time of the first photon (or triggers) on each pixel. Moreover, said electronic component is capable of integrating the radiation emitted on the whole of the emission of the scintillator 10, in about 500 ns, in order to determine the energy of the interaction.

Thus, the microelectronic component is adapted to measure the arrival time (Tpc) of the first photons on a first central pixel 12, as well as the arrival time ($T_{pa}$) of the first photons on a first pixel adjacent 13 to said first central pixel.

FIG. 1 shows that the arrival time of the first photons on a central pixel 12 is equal to Ti+Z/(c/n), wherein Ti corresponds to the time of interaction, Z is the coordinate of the point of interaction and corresponds to the interaction distance to the photo-detector 11; in other words, Z corresponds to the depth of interaction and (c/n) corresponds to the speed of the radiation in the crystal, with n varying from 1.7 to 1.9 depending on the crystal used. In this configuration, the first detected photons have never been scattered.

Insofar as the photon energy is known (i.e. 511 KeV), the number of photons detected over the duration of the light propagation along the length of the pixel can be measured, i.e. the first two hundred to six hundred picoseconds, said number of detected photons depends on the solid angle at which the interaction is viewed. Z can be statistically deduced by measuring this number of photons.

Besides, FIG. 1 shows that, in the adjacent pixels 13, the first detected ray corresponds to the photons scattered at point Z on the scattering surface of the pixel. Such beam undergoes multiple reflections before reaching the photo-detector, following a so-called blind process, as schematically shown in FIG. 1. In this case, the radiation propagation speed is equal to the group speed of said multi-scattered radiation and is approximately (c/2n). Therefore, the arrival time of the first photons in a pixel adjacent 13 to the central pixel 12 is approximately equal to Ti+Z(c/2n); wherein Ti is the time of interaction, Z is the coordinate of the point of interaction corresponding to the interaction distance to the photo-detector, and c/2n is approximately the propagation speed (group speed) of this radiation in the adjacent pixel 13.

The comparison between the arrival time of the radiation in the central pixel 12, namely (Ti+Z/(c/n)) and the arrival time of said radiation in the adjacent pixel 13, i.e. (Ti+Z(c/2n)) thus makes it possible to estimate Z, owing to the different propagation speed of light in such pixels.

In concrete terms, a time imaging of the pixels during an interaction makes it possible to estimate the depth of this interaction. If L is the length of a pixel, the depth of interaction is about L-Z. The average time "offset" of all the adjacent pixels, as such, could be more reliable than the individual values.

Assuming a detector is perfect, such offset of the arrival time of the first n photons will show some statistical fluctuation around the Z/(c/n)-Z(c/2n) value. In this case, the phase shift on a pixel block should be experimentally calibrated using for instance a 511 keV collimated source which will be measured for several Z points on the block. The statistical analysis of such an experiment will make it possible to estimate the location accuracy which can be reached using the method and, if necessary, to apply experimental corrections.

Scintillators of the lanthanum halide, LaBr3 type and the derivatives thereof, have the advantage of being cheaper and faster than lutetium silicates. Using such scintillators is preferred for implementing the present invention. As a matter of fact, a scintillator of the lanthanum halide, LaBr3 type emits most of its light in less than 100 ns.

Nevertheless, scintillators of the Lutetium silicate, LSO, LYSO type and/or the derivatives thereof can also be used.

Figure 2:
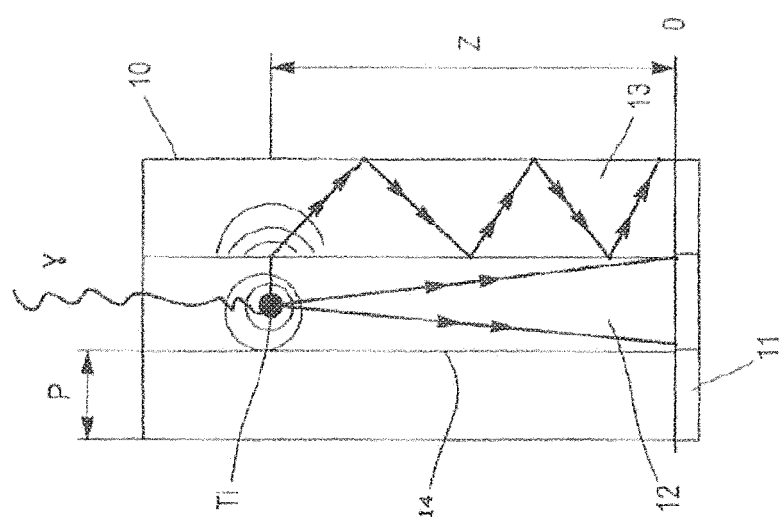
FIG. 2 shows the time calibration of the detectors.

FIG. 2 shows the principle of the method for time calibrating the detectors according to the present invention. This method consists of a time calibration of pixellated detectors relative to one another by observing a pulse of laser light that simultaneously illuminates them all. With such geometry, the arrival time of photons 1, 2 and 3 is identical for all channels. This makes it possible to calibrate the time response of each element of the photo-detector 11.

The method for determining the depth of interaction of the present invention does not, of course, prevent using the usual procedure of light intensity decoding of the PET type of the pixel blocks in order to measure the energy of interaction and identify the central pixel where the interaction took place.

The method of the invention makes it possible to greatly improve the quality of the image obtained when the scintillator is very fast, but not very dense, and thus subject to Compton scattering. Indeed, in the case of Compton scattering, the second pixel causing an emission will be a neighbor pixel directly (n+1) or indirectly (n+2) juxtaposed for geometric reasons. An interaction will occur in the second pixel as in the original pixel. Let p be the pitch of the array. For an event to be valid, it must be distant in time from the initial event by less than: 1 pc for n+1 (10 ps) and 2 pc (20 ps) for n+2. This makes it possible to separate "Compton" events, usable with respect to background noise.

A more complex analysis of time mapping and intensity of this event makes it possible, in most cases, to determine where the first interaction took place. The accuracy in the depth of the interaction (DOI) may be affected, but as very accurate data on Ti will be kept, the spatial resolution will be improved when compared to the prior art, thanks to the Time of Flight (TOF).

The advantages of the invention are numerous:

This method may be coupled with the previous ones. In particular, it enables a particularly accurate measurement of the time of interaction (Ti)

With this type of decoding, as explained above, the fastest and brightest intrinsic scintillators are those which give the best time and thus spatial resolution. Now the lanthanum halides are less expensive than the lutetium oxides used today.

With this type of scintillators, many events which are now unusable because of the Compton effect, which induces uncertainty about the pixel which has undergone the first interaction, can be exploited.

Such method for measuring the depth of interaction (DOI) does not require having two layers of detectors at each end of the crystal, which significantly reduces the cost of the detection system according to the invention.

Such method requires all pixels to be identically treated as regards scattering. It is therefore suitable for implementation on an industrial scale.

Example 1—Direct Interaction

Figure 3:
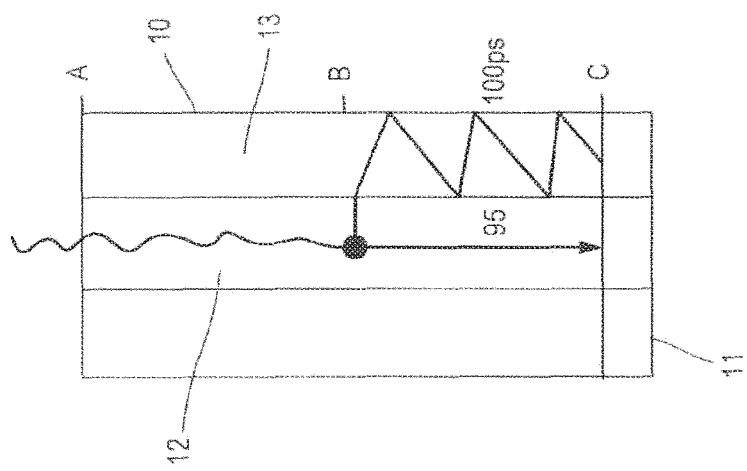
FIG. 3 shows a direct interaction (Example 1)

FIG. 3 shows an example of direct interaction in a central pixel 12 and an adjacent pixel 13. Let a pixel be LaBr3 (index n=1.9) and a length L be 30 mm. The number of detectable direct photons is arbitrarily 100.

On the 3 points, A=inlet face, B=middle, C=outlet face, then:

On a central pixel (n), the time of propagation of the radiation and the number of direct photons are:
A=190 ps 1
B=95 ps 2
C=0 ps 100

Figure 4:
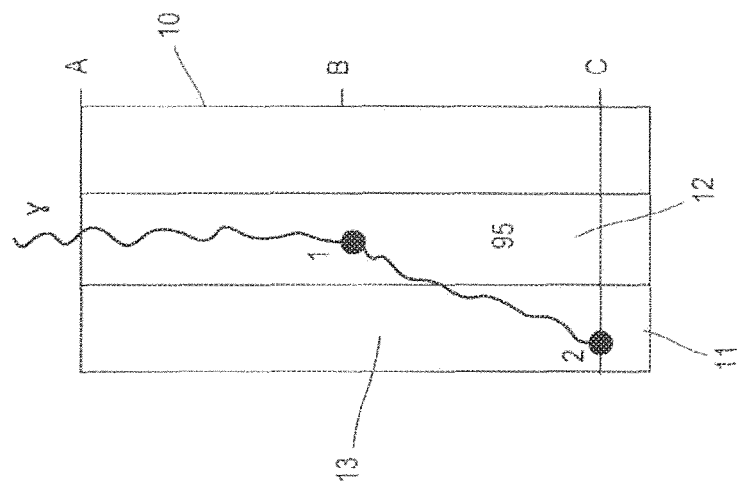
FIG. 4 shows the Compton effect on an adjacent pixel n+1 (Example 2).

On a neighbor pixel (n+1), the time of propagation of the radiation is:
A=390 ps
B=200 ps
C=10 ps The contrast of the propagation time between n and n+1 is:
A=200 ps
B=105 ps
C=10 ps Example 2—Compton Interaction FIG. 4 shows an exemplary Compton effect on an adjacent 13 pixel (n+1). Let a pixel be LaBr3 (index n=1.9) and a length L be 30 mm. The number of direct photons is 100.

On the 3 points, A=inlet face, B=middle, C=outlet face, then:

The time of propagation of the radiation and the number of direct photons are:
A=190 ps 1
B=95 ps 2
C=0 ps 100

On one neighbor pixel (n+1) the propagation time of the radiation is:
A=390 ps
B=200 ps
C=10 ps In the neighbor pixel (n+1), the Compton effect with a half-length shift:
(A→B or B→C)
B=145 ps
C=60 ps The contrast with the central pixel is:
A=−45 ps
B=−35 ps A Compton effect can be recognized in that the detection is almost simultaneous on two adjacent pixels.

The invention further relates to the application of the above radiation detector in PET imaging. The method for determining the depth of interaction described above is not exclusive of PET. It can be used outside the context of anti-coincidence to measure the depth of interaction (DOI) in any scintillator, provided that the light emission is fast. However, the invention is more particularly interesting in PET imaging.

The invention claimed is:

1. A method for determining the depth of an interaction in a pixellated gamma radiation detector comprising the following steps of:
   detecting first photons on the detector;
   measuring the arrival time (Tpc) of said first photons on the detector (10) for a central pixel (12); this time is equal to Ti+Z/(c/n); where Ti is the time of interaction; Z is the depth of interaction on the detector and c/n corresponds to the speed of radiation propagation in said central pixel;
   measuring the arrival time ($T_{pa}$) of the first photons in a pixel adjacent (13) to said central pixel; such time is approximately equal to Ti+Z(c/2n); where Ti is the time of interaction; Z is the depth of the interaction on the detector and c/2n is the speed of radiation propagation in said pixel adjacent to the central pixel;
   comparing the time ($T_{pa}$) with the time (Tpc) in order to estimate the depth of interaction (Z) owing to the different light propagation speeds in a pixel adjacent to the central pixel;
   integrating the radiation emitted over the whole of the emission of a crystal (10) of the detector (10) in order to determine the energy of the interaction;
   recording the integral of the energy emitted by this detection.

2. A gamma radiation detector for implementing the method according to claim 1, comprising a gamma source γ, a crystal scintillator (10) equipped with at least one photo-detector (11) capable of detecting the light individually emitted on each of the pixels, with said photo-detector being coupled to a microelectronic component of the ASIC type, with the reading of the at least one photo-detector (11) being executed by said microelectronic component, characterised in that the scintillator (10) is pixellated, in that the microelectronic component is adapted to measure the arrival time (Tpc) of the first photons on a first central pixel (12) and the arrival time (Tpa) of the first photons on a first pixel (13) adjacent to said first central pixel, so that a comparison of the time (Tcf) and the time (Tpa) makes it possible to estimate the depth of interaction (Z), and then to integrate the emitted energy.

3. A gamma radiation detector according to claim 2, wherein the faces of the pixels composing the scintillator (10) are scattering and the pixels are separated by a semi-transparent scattering medium.

4. A gamma radiation detector according to claim 3, wherein the semi-transparent scattering medium comprises a scattering rough crystal, an optical grease or a white powder filler dispersed in the optical grease such as boron nitride, alumina, barium sulfate.

5. A gamma radiation detector according to claim 3, wherein said semi-transparent scattering medium is adapted to ensure a partial transfer of the light from the central pixel to the adjacent pixel as well as a scattering of the light passing through or reflected by said medium.

6. A gamma radiation detector according to claim 2, wherein the detector is adapted to measure a number of photons detected during the light propagation time along the length of each pixel, with said number of detected photons depending on the solid angle at which the interaction is seen for a given photon energy.

7. A radiation detector according to claim 2, wherein the scintillator emits most of its light in less than 100 ns, and is of the Lanthanum halide, LaBr3 type and/or the derivatives thereof.

8. A radiation detector according to claim 2, wherein the scintillator is of the Lutetium silicate, LSO, LYSO type and/or the derivatives thereof.

9. A method for time calibrating several gamma radiation detectors according to claim 2, characterised in that it comprises the following steps:
sending a pulse of laser light to simultaneously illuminate said detectors;
measuring the arrival time of photons (1, 2, 3) for all the channels;
calibrating the time response of each detection element.

10. The gamma radiation detector according to claim 2, wherein the microelectronic component is capable of measuring the time of arrival of the first photons on a pixel with an accuracy of less than 100 ps and in that it is further capable of integrating the radiation emitted over the whole scintillator emission in 500 ns in order to determine the energy of the interaction.

\* \* \* \* \*